Patented Nov. 27, 1945

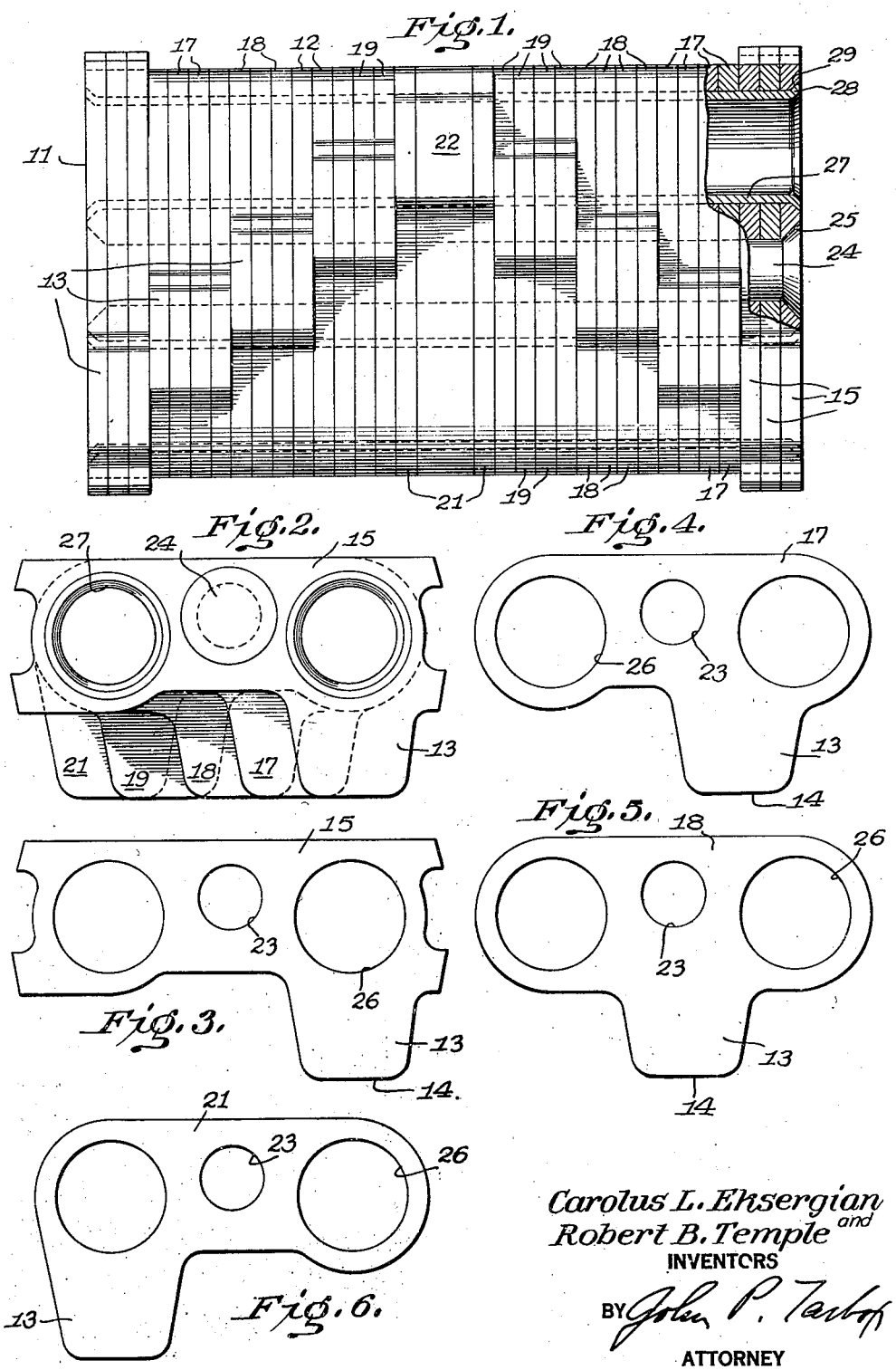

2,389,722

UNITED STATES PATENT OFFICE 2,389,722

TANK TREAD

Carolus L. Eksergian, Detroit, and Robert B. Temple, Grosse Pointe Park, Mich., assignors to Budd Wheel Company, Philadelphia, Pa., a corporation of Pennsylvania Application June 23, 1943, Serial No. 491,928

5 Claims. (Cl. 305—10)

This invention relates to treads for endless tracks as employed on tractors, military tanks and other types of vehicles, and particularly to the individual tread shoes which are flexibly joined together to form such tracks.

Heretofore, these shoes have usually been formed of rubber blocks, steel castings or some similar unitary construction. At the present time the shortage of rubber and the overburdened condition of facilities for making castings render difficult obtaining the conventional type of tread shoe, and the object of the present invention is to provide an improved track shoe of the type described, constructed and arranged to eliminate the need for rubber blocks, steel castings, or the like.

A further object is to provide a tread shoe constructed and arranged to be made by simple stamping or forging operations.

These and other objects which will be apparent are attained by the present invention, one embodiment of which is illustrated in the accompanying drawing in which:

Fig. 1 is a plan view of the tread face of a shoe constructed in accordance with one embodiment of this invention;

Fig. 2 is an end elevation of the shoe shown in Fig. 1, and

Figs. 3, 4, 5, and 6 are similar views of the different types of individual laminations employed in making the shoe illustrated in Figs. 1 and 2.

In the illustrated embodiment of this invention, each tread shoe is formed by a number of laminations which are firmly secured together to form a complete shoe. Tread forming lugs, or heels project outwardly from the laminations to form the tread surface of the shoe and the laminations are so combined that the tread surfaces of the lugs form a definite, predetermined pattern. The individual laminations can be made by a simple stamping or forging operation, and the need for solid blocks of rubber, steel castings, or the like is entirely eliminated.

As illustrated, the tread shoe 11 is formed by a plurality of laminations 12 which are built up to provide a shoe of predetermined dimension, the width of the shoe depending entirely upon the number of laminations employed in making it. Each lamination has a tread forming lug or heel 13 having a hardened edge 14 forming the tread surface.

The individual laminations are of several types, and the location of the lugs thereon will depend upon the pattern of tread surface which the finished shoe is to have. As illustrated, the pattern is a V, or of chevron form. For this purpose the laminations 15 at the edges of the shoe, shown as three in number, but obviously capable of being any desired number, have the lug 13 formed at one end thereof as shown in Figs. 1, 2, and 3. The next type of laminations 17, see Figs. 1 and 2, has the lug 13 adjacent one end but spaced somewhat from that end. The next type of laminations 18, see Figs. 1 and 5, has the lug 13 almost in the center of the lamination. The next laminations 19, see Fig. 1, are similar to the laminations 17, but are reversed in assembly so as to position the lugs 13 thereon as shown in Fig. 1. This arrangement permits use of single type of lamination to form different parts of the shoe. The center laminations 21, see Figs. 1 and 6, have the lug 13 formed at one end.

Because of the allowable tolerances in manufacturing each lamination, it will be readily apparent that different shoes, each made up of numerous laminations, may vary substantially in width. To overcome this, a central spacing member 22 of selected size is located between the different groups of laminations to provide a shoe having a definite, predetermined width. In assembling, the group of laminations 15, 17, 18, and 19 forming one side of the shoe are placed together under pressure and their width is carefully measured. The laminations 15, 17, 18, and 19 forming the other side of the shoe are then similarly pressed together and their width measured. A spacing member 22 of proper width is then selected for positioning between the two groups of laminations so that the finished shoe will have predetermined width.

As illustrated, each lamination has a central opening 23 for receiving a securing means to clamp the laminations and spacer in assembled relation. Preferably, a rivet 24 is employed and is secured in place while hot so that upon cooling the contraction of the rivet stud will draw the laminations firmly together. The central opening in the end lamination 15 has a beveled face 25, see Fig. 1, to accommodate the rivet head.

Each lamination has an opening 26 in each end thereof and a tubular liner 27 is press fitted cold in such openings 26 at each edge of the shoe after the laminations are assembled. Each end 28 of each tube is expanded to engage the chamfered opening 29 in the end link 15. For this purpose, the end of the tube can be heated or the expanding operation can be cold if desired. The tubes 27 constitute bearing tubes for receiving rubber bushings of the so-called "doughnut" type carrying inner studs for connection to intermediate links (not shown) which are employed in connecting the successive shoes of a track together to form the completed track.

It will be apparent, of course, that use of the intermediate spacers 22 can be eliminated by grinding the individual laminations to accurate size so that a predetermined number of laminations will always produce a shoe having a predetermined width. It will also be apparent that if the bearing tubes 27 are sufficiently thick walled, they can be relied upon to secure the laminations together and in this way eliminate the need for the securing center rivet 24. If the laminations are stampings they will be relatively thin, as shown, but if they are formed of forgings it may be desirable to provide a single forging of greater width than a single lamination. For example, a single forged piece may be thick enough to take the place of the several laminations 17, and another forging take the place of the several laminations 18 and so on. In this case the lug on each forging would extend the full width thereof and perform the function of the plural lugs 13 on each set of stampings.

It may be possible in some instances, where the rivet 24 is employed to eliminate the bearing tubes 27 and insert the pivot bearings with the "doughnut" rubber bushings directly in the openings 26, but the use of the tubes which bind the laminations together at separate points at the opposite ends of the laminations lend greater rigidity to the composite structure, and may lighten somewhat the total weight by permitting the elimination of the center rivet 24. Increased rigidity may also be obtained by projections from the lateral faces of one lamination fitting into corresponding depressions in the contiguous faces of adjacent laminations. For example, the holes through the different laminations can be coined slightly toward one side to fit into coined depressions in adjoining holes, or dimples or other formations may be stamped in the laminations to match corresponding formations in adjacent laminations. Obviously, various lugs 13 can be so located on the respective laminations as to provide any desired pattern of tread surface.

Although we have described a specific embodiment of this invention it will be apparent that the details thereof can be variously modified and adapted within the scope of the appended claims.

What is claimed is:

1. A tread shoe comprising separate laminations, hardened tread forming surfaces formed on said laminations, means clamping said laminations together, and means for holding the individual laminations against relative lateral movement comprising link-connecting tubes extending through said laminations.

2. A track shoe comprising a plurality of laminations of substantially rectangular shape having an integrally formed tab at one edge thereof, said laminations being assembled with the tabs protruding outwardly from the body of the shoe to form a grouser, certain of said tabs being offset with respect to the other tabs to impart a definite tread pattern for the grouser, and means for securing the laminations together.

3. A track shoe for track-laying vehicles comprising a plurality of plates having grouser tabs at one edge thereof, said plates being rigidly secured together in face-to-face relation and having aligned openings at their opposite ends, and link pin-receiving tubes extending through said openings at said opposite ends.

4. A track shoe for track-laying vehicles comprising a plurality of metallic plates disposed in face-to-face relation, and means rigidly securing said plates together, each of said plates having an integral tab projecting from one edge thereof, said plates being arranged in groups, each group including a plurality of plates with the tabs thereof aligned with each other, the tabs of each group of plates being offset longitudinally of the plates relative to the tabs of an adjacent group of plates.

5. A track shoe for track-laying vehicles comprising a plurality of metallic plates disposed in face-to-face relation and having integral tabs projecting from one edge thereof to form a predetermined grouser pattern, and means rigidly securing said plates together against relative movement, said plates having aligned openings at each end thereof for link pin connection with an adjacent track shoe.

CAROLUS L. EKSERGIAN.
ROBERT B. TEMPLE.